H. C. H. WALSH.
AUTOMATIC CLUTCH FOR DIE PRESSES.
APPLICATION FILED AUG. 22, 1907. RENEWED JAN. 13, 1913.
1,133,344. Patented Mar. 30, 1915.
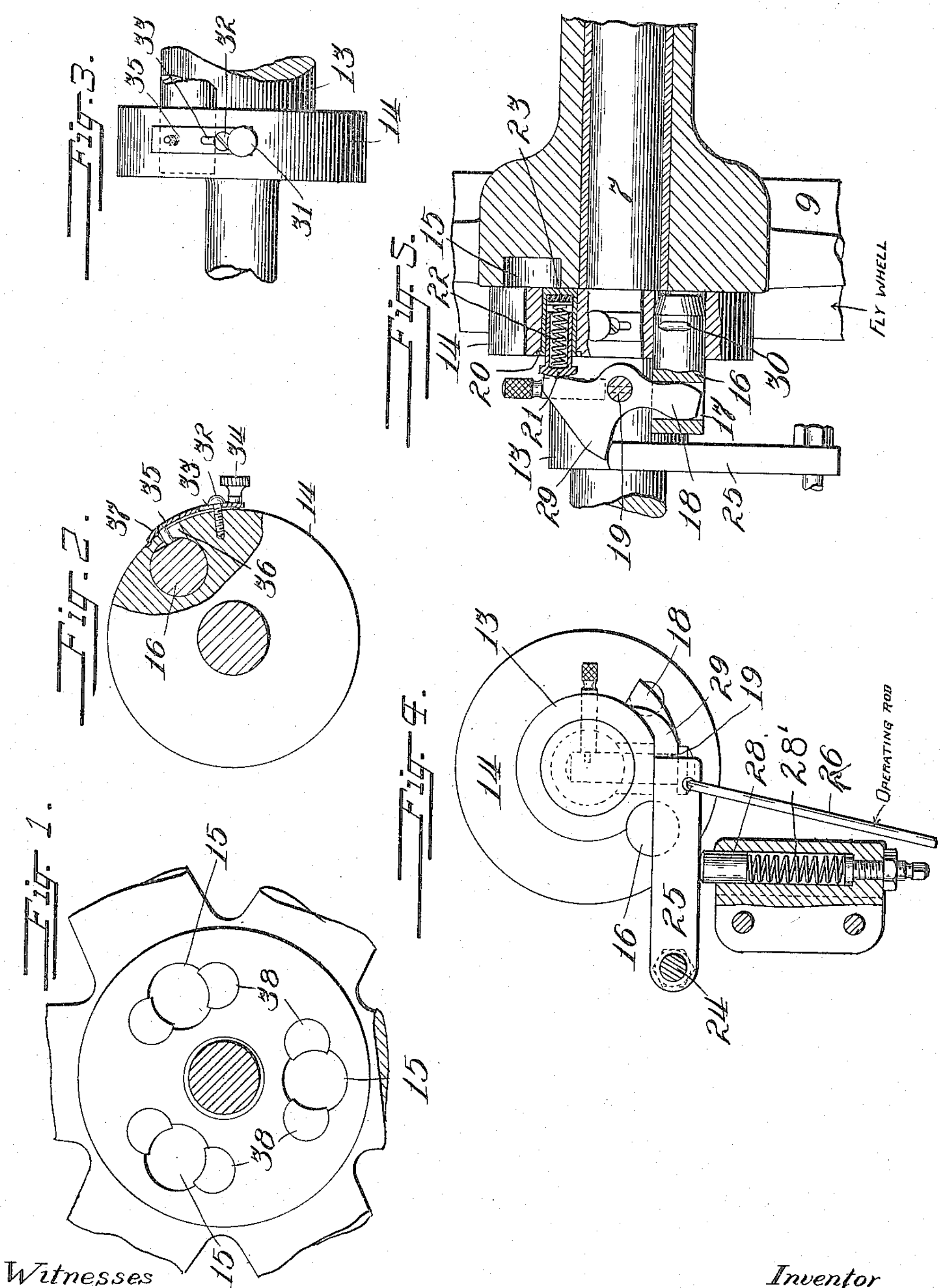
Witnesses
Milton Lenoir
Frank L. Belknap
Inventor,
Harry C. H. Walsh,
By Albert N. Graves
Attorney.
THE NORRIS PETERS CO., PHOTO-LITHO., WASHINGTON, D. C.

UNITED STATES PATENT OFFICE.

HARRY C. H. WALSH, OF CHICAGO, ILLINOIS.

AUTOMATIC CLUTCH FOR DIE-PRESSES.

1,133,344. Specification of Letters Patent. Patented Mar. 30, 1915.

Original application filed May 9, 1907, Serial No. 372,709. Divided and this application filed August 22, 1907, Serial No. 389,641. Renewed January 13, 1913. Serial No. 741,881.

*To all whom it may concern:*

Be it known that I, HARRY C. H. WALSH, a citizen of the United States, residing at Chicago, in the county of Cook and State of Illinois, have invented certain new and useful Improvements in Automatic Clutches for Die-Presses, of which the following is a specification.

This invention relates to improvements in automatic clutches for die presses and has among its salient objects to provide improvements in the arrangement and construction of an automatic clutch slide whereby the main shaft is, at will, clutched to the constantly rotating fly-wheel; to provide a construction in which the clutch slide or pin is automatically released from the fly-wheel at a predetermined revolution of the main shaft; to provide a construction in which the clutch slide and operating mechanism therefor are secured to the main shaft and are normally free from the constantly rotating fly-wheel; to provide a construction in which the clutch slide or pin is forced out of the fly-wheel by a positive spring pressed pull; and in general to provide improvements in the character referred to.

The invention will be readily understood from the following description, reference being had to the accompanying drawings in which—

Figure 1 is a detail showing the shaft in cross section and the end of the fly-wheel in elevation. Fig. 2 is a partially sectional detail of the clutch collar keyed upon the shaft and showing particularly the arrangement of the clutch slide locking mechanism. Fig. 3 is an elevation of the parts shown in Fig. 2; Fig. 4 is a sectional detail showing the shaft in cross section and the clutch collar and parts mounted thereon in elevation; Fig. 5 is a view taken axially through the hub of the fly-wheel and showing in sections certain other parts, the clutch slide mechanism being shown chiefly in elevation.

Referring to the drawings;—upon the shaft 7 is a collar 13 adjacent to one of the bearings 6 and a collar 14 adjacent to the first collar. These collars are solid with the shaft and are intended to hold the clutching apparatus used in starting and stopping the press. This clutching apparatus consists essentially in a pin or slide which passes through the larger of the two collars and is arranged to engage any one of the series of openings 15 in the hub of the fly-wheel 9 which hub lies closely adjacent to the outer face of the larger collar. This pin is shown at 16 and is provided with a slot 17 for receiving one end of a pivoted lever 18. The lever 18 is pivoted upon the pin 19 which enters in a collar 13 as shown in Figs. 6 and 7. Within the collar 14 is a tube 20 in which slides a second tube 21 and in these is a spring 22 acting to push the tube 21 upwardly. The tube 20 has a closed bottom and in this bottom is a rubber cushion 23 arranged to be engaged by an inner end of the tube 21 when said tube is pushed inwardly to its extreme position. The outer end of the tube 21 is closed and in the form of a head which engages one arm of the lever 18 and through that arm the spring 22 acts to push the pin 16 through the collar 14 so as to cause said pin to engage one of the openings 15 in the wheel 9.

Pivoted at 24 on the frame of the machine is a tripping arm 25 which is operated by a rod 26 from the foot lever of the press. A spring actuated pin 28 on the frame acts to hold the arm 25 in contact with the surface of the collar 13. In this position a rotation of the collar 13 carrying the lever 18 will cause the arm 29 of the said lever to engage the end of the tripping arm 25 the effect of which is to compress the spring 22 and draw the pin 16 out of engagement with an opening 15 in the wheel 9. The arm 25 in thus acting also serves to stop the rotation of the shaft 7 by the pressure exerted upon the arm 29 and through that arm upon the spring 22. These parts are so arranged that the spring 22 can be compressed for some little distance after the pin 16 has been withdrawn from engagement with an opening 15 in the wheel 9. This furnishes a yielding stop for said shaft, the yield being not in the stop itself but in the mechanism carried by the shaft which mechanism forms part of the clutching device used for engaging and disengaging the power wheel 9. When the shaft is stationary and the tripping lever 25 is moved through placing the foot upon the treadle the end of said lever 25 is removed from the arm 29 of the lever 18 and permits the spring 22 to turn said lever so as to force the slide or pin 16 toward the wheel 9. As this wheel is in continued rotation the slide or pin 16 will engage and enter the first opening 15 and the further rotation of the said wheel will drive the shaft until the pin is removed from engagement.

In normal operation the tripping lever is moved so as to disengage itself from the arm 29 of the lever 18 and then is permitted to immediately return to contact with the collar 13 by the action of the pin 28 under the springs 28′. When this occurs the arm 29 will engage the end of the tripping lever 25 as soon as the shaft 7 has made one complete revolution.

The pin 16 is provided with a small groove 30 (Figs. 4 and 7) and on the outer face of the collar 14 is a small plate 31 held in place by a screw 32 which passes through the slot 33 in the plate 31. A knob or handle 34 serves as a means for moving said plate on said screw. At the opposite end of the plate 31 is an inwardly projecting pin 35 which pin projects into a slot 36 in the collar 14. In the collar 14 is a slight groove which is engaged by the lip 37 of the plate 31 when said plate is pushed into the position shown in Fig. 4. The action of this lip and groove 37 is to hold the plate in that position. The pin 35 is so located with respect to the groove 30 that when the pin 16 is withdrawn from locking position with the wheel 9, pin 35 may be shifted into said groove and lock the spring 22 from acting upon the pin or slide 16 so as to cause said slide to clutch the wheel. The object of this is to enable the operator at any time to secure the clutching device in unlocked position so that there will be no danger of the machine being accidentally started during the time when the operator is fixing some part and it is necessary for the machine to be idle. When it is desired to put the machine again in operative condition it is merely necessary to shift the knob 34 and thus remove the pin 35 from the groove 30. When this is done the machine is ready to start at any time upon movement of the tripping lever 25.

The hub of the wheel 9 preferably has in it a plurality of openings 15 as shown in Fig. 3. Each one of these openings is formed partly by the surface of the metal which forms the hub of the wheel and partly by pins 38 which are driven into the hub of the wheel and serve as bearing surface for the slide or pin 16 when it is inserted in the openings 15. These pins 38 form wearing surface which may be removed as they wear.

From the foregoing it will be obvious that the clutch mechanism is normally in stationary inoperative position. When it is desired to clutch the shaft to the rotating fly-wheel the operator presses down the treadle connected to the rod 26 which carries downwardly the tripping lever against the action of its spring pressed pin which instantly releases the arm 29 and permits the spring 22 to force the clutch pin 16 into one of the openings 15 through the action of the spring 22. The shaft now being clutched to the rotating fly-wheel commences to turn. The operator releases the treadle and the tripping lever flies upwardly through the action of the spring pressed pin 28 and rides against the shaft. When the shaft has completed one revolution the arm 29 engages the tripping lever and its free end is forced upwardly on its pivot drawing the clutch pin out of the fly wheel. The spring 22 is at the same time forced inwardly by the action of the arm 29 and tends to stop further rotation of the shaft, which may also be limited by any suitable breaking mechanism not here shown. The fly wheel now rotates independently of the clutch mechanism and the shaft which are again in operative position ready to be clutched to the fly-wheel.

I claim as my invention:

1. In a die-press, the combination with an operating shaft, a power-wheel, and a spring-actuated slide for locking the two together, of a sliding plate carried by said shaft and provided with an inwardly projecting pin located adjacent to said locking slide, said plate and pin being so located that upon being moved from normal position the locking slide will be held from engagement with the wheel.

2. In a die-press, the combination of a normally idle shaft having an integral collar provided with a pair of openings parallel with the axis of said shaft, a constantly rotating fly-wheel provided with an opening in its hub by which the shaft may be locked to the wheel, a pin adapted to slide in one of said openings and to engage the hole in the hub, a T-shaped lever pivoted to said shaft and having one of its ends adapted to engage said pin to move it into engagement with the hole in the hub, a coil spring seated in the other opening in said collar and adapted to be engaged and compressed by another end of said lever, and a tripping arm normally engaging the other end of said lever to compress said spring and hold said pin out of engagement with the hole in said hub.

3. In a die-press, the combination of a normally idle shaft having a collar secured thereto provided with an aperture axially parallel with the axis of said shaft, a constantly rotating fly-wheel provided with an opening in its hub by which said shaft may be locked to the wheel, a slide having bearing in said aperture and adapted to engage the opening in said hub to lock the wheel to the shaft, a bell-crank lever mounted on the exterior of said shaft having a pivot radially arranged with respect to said shaft and having one of its arms adapted to engage said slide to hold it out of engagement with the opening in said hub, a tripping-arm adapted to engage the other arm of said lever to hold said slide out of engagement with said opening in the hub, and a spring adapted to force said slide into engagement with the opening in said hub.

HARRY C. H. WALSH.

Witnesses:
ALBERT H. GRAVES,
EMILIE ROSE.

Copies of this patent may be obtained for five cents each, by addressing the "Commissioner of Patents, Washington, D. C."